US007534961B2

(12) United States Patent
Schumacher

(10) Patent No.: US 7,534,961 B2
(45) Date of Patent: May 19, 2009

(54) METHOD OF CONTACTING AN ELECTRICAL CONDUCTOR AND FLEXIBLE ELEMENT FOR PROVIDING AN ELECTRICAL CONTACT

(75) Inventor: Otto Schumacher, Sarstedt Ot. Heisede (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/966,119

(22) Filed: Dec. 28, 2007

(65) Prior Publication Data

US 2008/0190648 A1 Aug. 14, 2008

(30) Foreign Application Priority Data

Feb. 12, 2007 (EP) .................................. 07290183

(51) Int. Cl.
*H02G 15/02* (2006.01)

(52) U.S. Cl. ........................................................ 174/78

(58) Field of Classification Search ............... 174/75 C, 174/78, 88 C
See application file for complete search history.

(56) References Cited

U.S. PATENT DOCUMENTS

| | | | | |
|---|---|---|---|---|
| 5,006,286 | A * | 4/1991 | Dery et al. | 264/408 |
| 6,066,800 | A * | 5/2000 | Renaud | 174/36 |
| 6,545,220 | B2 * | 4/2003 | Syed et al. | 174/75 C |
| 6,777,616 | B2 * | 8/2004 | Beele | 174/650 |
| 2002/0096355 | A1 | 7/2002 | Daume | |
| 2005/0224653 | A1 | 10/2005 | Miener | |

FOREIGN PATENT DOCUMENTS

| | | | |
|---|---|---|---|
| DE | 2741791 | B1 | 7/1978 |
| DE | 3112526 | A1 | 10/1982 |

* cited by examiner

*Primary Examiner*—Chau N Nguyen
(74) *Attorney, Agent, or Firm*—Fay Sharpe LLP

(57) ABSTRACT

A method of contacting an electrical conductor (1) having a conducting core (2) covered partly by an insulating material (3), comprising installing a contacting device (10) in electrical contact with the conducting core in a position (4) where the conducting core is free from the insulating material. Said method further comprises a flexible element (5) comprising an electrically conducting material over the conducting core in said position prior to installing the contacting device, the flexible element comprising at least one adhesive portion (8) which adheres to the insulating material in a vicinity of said position and a non-adhesive portion (7) which contacts the conducting core.

10 Claims, 2 Drawing Sheets

METHOD OF CONTACTING AN ELECTRICAL CONDUCTOR AND FLEXIBLE ELEMENT FOR PROVIDING AN ELECTRICAL CONTACT

The invention is based on a priority application EP 07 290 183.8 which is hereby incorporated by reference.

TECHNICAL FIELD

The present invention relates to a method of contacting an electrical conductor having a conducting core covered partly by an insulating material, comprising installing a contacting device in electrical contact with the conducting core in a position where the conducting core is free from the insulating material.

The present invention also relates to a flexible element for providing an electrically conducting contact between a contacting device and an electrical conductor, in particular according to the method in accordance with the present invention.

BACKGROUND OF THE INVENTION

Coaxial cables or metallic tubes or pipes, which are externally covered with an insulating material, are usually stripped locally of the insulating material and contacted in electrical conducting fashion with a contacting device for lightening protection or potential equalization purposes. For example, a clamp-like contacting device is installed on the conducting core of the electrical conductor in a position where the conducting core is free or has been freed from said insulating material. While the contacting device provides an electrically conducting contact for lightening protection purposes it is also intended to protect the (bared) conducting core from external influences, e.g. water, dust, or the like. Therefore, the problem arises to provide a thorough electrical contact with low contact resistance on the one hand, while sealing the contact position as hermetically as possible against external influences.

In the prior art, the above-mentioned technical problems have been tackled by using clamp-like contacting devices which typically comprise a contact element for providing an electrically conducting connection with the conducting core, a grounding cable connected with the contact element, and a main body which mechanically holds the contact element in place and hermetically seals the contacting position against an entry of humidity, dust, or the like.

However, contacting devices of the above-mentioned kind do not achieve satisfactory sealing properties in case of tolerances of the insulating material. Furthermore, the electrical contact between said contact element and the conducting core suffers from high contact resistance if an outer surface of the conducting core is not smooth, e.g., in case of a braided or woven outer conducting layer.

SUMMARY OF THE INVENTION

It is the object of the present invention to provide a method of the above-defined type which achieves a thorough electrically conducting contact between a contacting device of conventional construction and a conducting core of an electrical conductor while at the same time providing superior weather resistance or sealing properties with respect to the prior art. The invention also aims at providing a flexible element which can be used to carry out said method.

According to a first aspect of the present invention the object is achieved by providing a method of the above-defined type which is characterised by providing a flexible element comprising an electrically conducting material over the conducting core in said position prior to installing the contacting device, the flexible element comprising at least one adhesive portion which adheres to the insulating material in a vicinity of said position and a non-adhesive portion which contacts the conducting core.

According to a second aspect of the present invention the object is achieved by providing a flexible element for providing an electrically conducting contact between a contacting device and an electrical conductor, in particular according to the method in accordance with said first aspect of the present invention, the electrical conductor including a conducting core which is partly covered by an insulating material, wherein said contact is to be formed in a position where the conducting core is free from the insulating material, the flexible element comprising at least one adhesive portion which is devised to adhere to the insulating material and a non-adhesive portion which is devised to contact the conducting core.

Thus, according to a basic idea of the present invention, after removing some of the insulating material (if the electrical conductor is completely covered with the insulating material) and before installing a grounding kit comprising said contacting device, a flexible element with the above-mentioned properties, e.g. a metal foil, is provided over that part of the electrical conductor which is free from said insulating material. The flexible element, e.g. the metal foil, has a first portion with adhesive properties which are chosen so that the flexible element can adhere to the insulating material of the electrical conductor. Another, non-adhesive portion of the flexible element is arranged relative to said adhesive portion so that it lies over the (bared) conducting core when said adhesive portion adheres to said insulating material. In the context of the present document, the term "bared" refers to some part of the conducting core of the electrical conductor which is not covered by any insulating material so that the conducting core is exposed. Having provided a flexible element in the above-described fashion, a conventional grounding kit (contacting device) without specific sealing measures can then be installed over, i.e., on top of, said flexible element. This construction achieves increased sealing protection while providing an improved electrical contact, especially in connection with conducting cores having a non-smooth outer surface.

Preferred embodiments of the present invention are mentioned in the sub-claims, the wording of which is herewith incorporated by reference of the present description in order to avoid unnecessary repetition of text.

An embodiment of the present invention consists in placing a partly adhesive flexible element, e.g., a metal foil, on a section of metallic tube or an outer conductor of a coaxial cable, which is free from an external insulating material. The flexible element, e.g., the metal foil, may be devised in a way that its electrochemical potential corresponds to an electrochemical potential of the material of the metallic tube or the outer conductor of the coaxial cable.

The adhesive portion of the flexible element is then placed on the insulating material of the electrical conductor. Another portion of the flexible element, which is not provided with any adhesive, is placed in direct contact with the metal tube or with the outer conductor of the coaxial cable. In this way an electrically conducting connection to the metallic tube or the outer conductor of the coaxial cable is achieved while the adhesive contact of flexible element with the insulating material provides an essentially water- and dust-proof sealing with respect to the exterior.

Due to its flexible nature, the flexible element in accordance with embodiments of the present invention may form a close contact surface with non-smooth conducting cores, such as braided or woven conductors, thus ensuring low contact resistance.

The present invention can be used to provide lightening protection, in particular for mobile communication applications. In order to achieve this, a contact strip with a suitable fixing device, e.g. a grounding kit comprising a conventional contacting device, is provided on the surface of the cable or tube prepared by providing a flexible element in accordance with embodiments of the present invention. Then the contacting device is connected by means of a suitable cable with a corresponding lightening protection apparatus.

In this way, embodiments of the method in accordance with the present invention provide at the same time an electrically conducting contact between the conducting core of an electrical conductor and a contacting device while sealing an exposed part of the conducting core in the form of a metallic tube or cable against humidity, dirt, and other environmental influences.

As already mentioned above, another embodiment of the flexible element in accordance with the invention comprises using a plastically deformable and partly adhesive metal foil, which has a similar or identical electrochemical potential as the metallic tube or cable to be contacted.

According to a further embodiment of the invention, the flexible element, e.g., the metal foil, has adhesive portions along two or more of its edge portions, preferably along three of its edge portions.

In another embodiment of the flexible element in accordance with the invention the adhesive portion may comprise thin butyl tubes or butyl layers.

According to yet another embodiment of the present invention, a contacting device is placed on the upper surface of the flexible element, wherein the contacting device is connected with a conductor for removing lightening currents.

According to another embodiment of the present invention the whole construction including the flexible element and contacting device is covered by means of a protecting envelope to seal it from external influences.

According to yet another embodiment of the present invention the flexible element is wrapped around the electrical conductor several times in order to produce a plurality of layers of the flexible element. This enhances the degree of protection especially if the shape of the flexible element is made in such a way that it has a smaller (narrower) and a wider end, starting the installation with the smaller end.

For some types of cables the insulating material does not only have a sealing function but also contributes to the mechanical stability of the cable. In that case a multiple layer of the flexible element can also provide the mechanical function of the removed insulation section.

By exchanging a material of the flexible element, the construction provided by means of the present invention can be easily adapted to various materials of the conducting core.

In another embodiment of the present invention, the flexible elements may be a bi-metal foil, wherein an inner layer corresponds to the material of the conducting core and wherein a material of an outer layer corresponds to the material of the contact element, i.e., the contacting device.

Further advantages and characteristics of the present invention can be gathered from the following description of preferred embodiments given by way of example only with reference to the enclosed drawings. Features mentioned above as well as below can be used in accordance with the present invention either individually or in conjunction. The following description is not to be regarded as an exhaustive enumeration but rather as examples with respect to a general concept underlying the present invention.

DETAILED DESCRIPTION OF PREFERRED EMBODIMENTS

Figure 1:
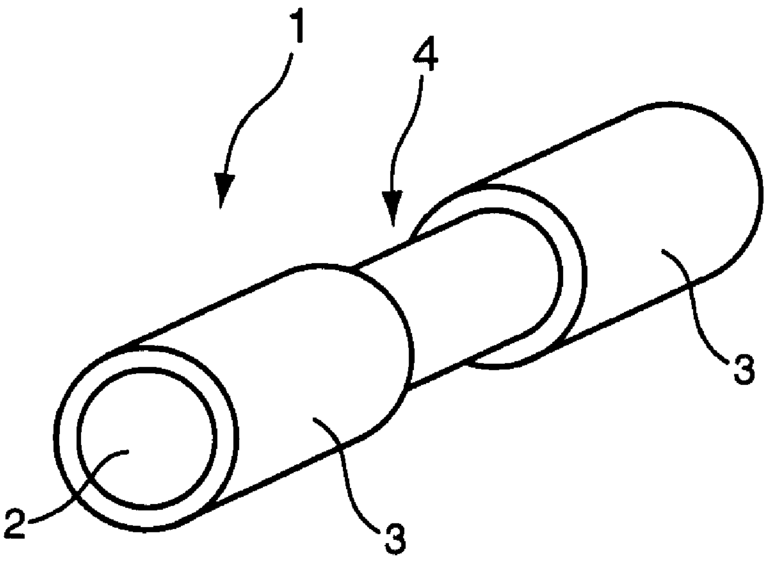
FIG. 1 is a schematic representation of an electrical conductor having a contacting core which is partly covered by an insulating material.

FIG. 1 shows a schematic representation of an electrical conductor 1 having a contacting core 2 which is partly covered by an insulating material 3. The conducting core 2, according to the exemplary embodiment of FIG. 1, is devised in the form of a metal tube or metal pipe. Insulating material 3 can be any suitable material used for protecting electrical conductors, e.g. a plastic material.

However, as will be appreciated by a person skilled in the art, the conducting core 2 may take on any other form suitable for forming the electrical conductor 1. For example, conducting core 2 may comprise an arrangement of a plurality of conducting wires (not shown) so that electrical conductor 1 may effectively be devised in the form of a coaxial cable and may further comprise a braided or woven outer conducting layer (not shown). Coaxial cable of the above-mentioned type are preferably used for high frequency applications, e.g., for connecting base stations and antennas in mobile communication installations. If, in this context, the conducting core 2 of electrical conductor 1 comprises a braided, woven or corrugated outer conducting layer (not shown in FIG. 1), the conducting core 2 does not present a smooth outer surface.

In a position 4 the conducting core 2 is free from the insulating material 3. In accordance with the present invention, electrical conductor 1 may either be pre-fabricated with a bared conducting core 2 in said position 4, or the insulating material 3 may be (manually) removed or stripped off in order to form said position 4 of bared conducting core 2.

As already stated above, the conducting core 2 is preferably made of metal, such as copper or the like. However, the present invention generally is not limited to conducting cores made of metal.

For many applications, such as the exemplary high frequency application mentioned above, the conducting core 2 of electrical conductor 1 must be electrically connected with a contacting device for lightening discharge protection purposes, i.e., must be grounded. Grounding or earthing kits are usually employed for that purpose. They comprise a contacting device, which generally takes on the form of a contacting clamp and which is placed on the conducting core 2 in an electrically conducting fashion at position 4, i.e., in a position where the conducting core 2 is free from insulating material 3.

Figure 2:
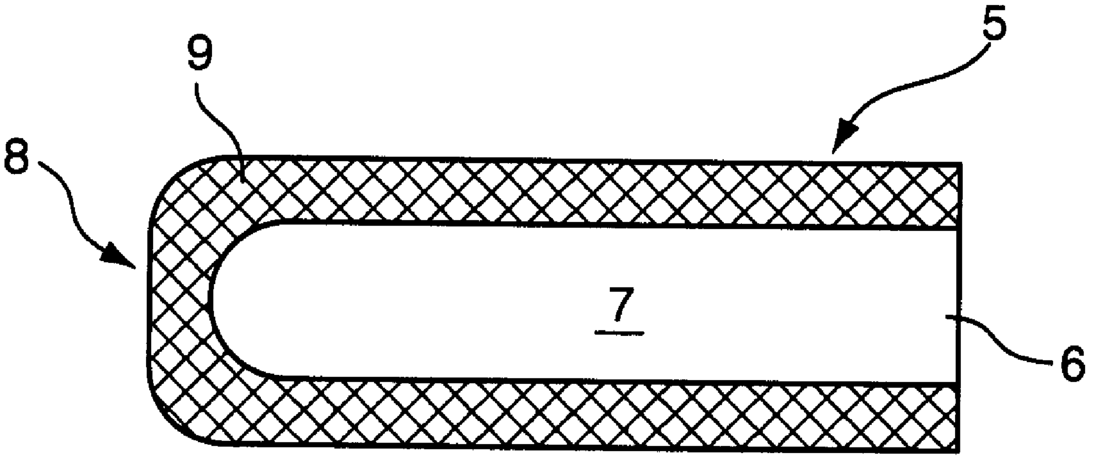
FIG. 2 is a schematic representation of a flexible element in accordance with an embodiment of the present invention.

In order to achieve a thorough electrical contact with low contact resistance while sealing the contact area hermetically against external influences, e.g. humidity or dust, according to the present invention a flexible element, as disclosed in an exemplary fashion in appended FIG. 2, is provided in said position 4 prior to installing the contacting device.

FIG. 2 shows a schematic representation of a flexible element in accordance with an embodiment of the present invention. The flexible element 5 of FIG. 2 is made from an electrically conducting material 6 and shows two distinct portions: a first portion 7 in which the electrically conducting material 6 of flexible element 5 is exposed, and a second portion 8, which can also be referred to as an adhesive portion. In the adhesive portion 8, the flexible element comprises an adhesive 9, e.g., in the form of butyl structures, such as butyl tubes or the like, or any other suitable adhesive. With adhesive 9, flexible element 5 is intended to adhere to the insulating material 3 of electrical conductor 1 (FIG. 1). With its non-adhesive portion, i.e., said first portion 7, flexible element 5 is intended to contact the conducting core 2 of electrical conductor 1 in said position 4 (FIG. 1).

According to the exemplary embodiment of FIG. 2, the adhesive portion 8 has an overall U-shaped configuration, i.e., the adhesive portion 8 extends along three edges in a border area of flexible element 5, which is of overall rectangular shape.

Preferably, flexible element 5 is made of a metal foil 6 which is partly covered with adhesive 9 to form said first and second portions 7, 8.

Figure 3:
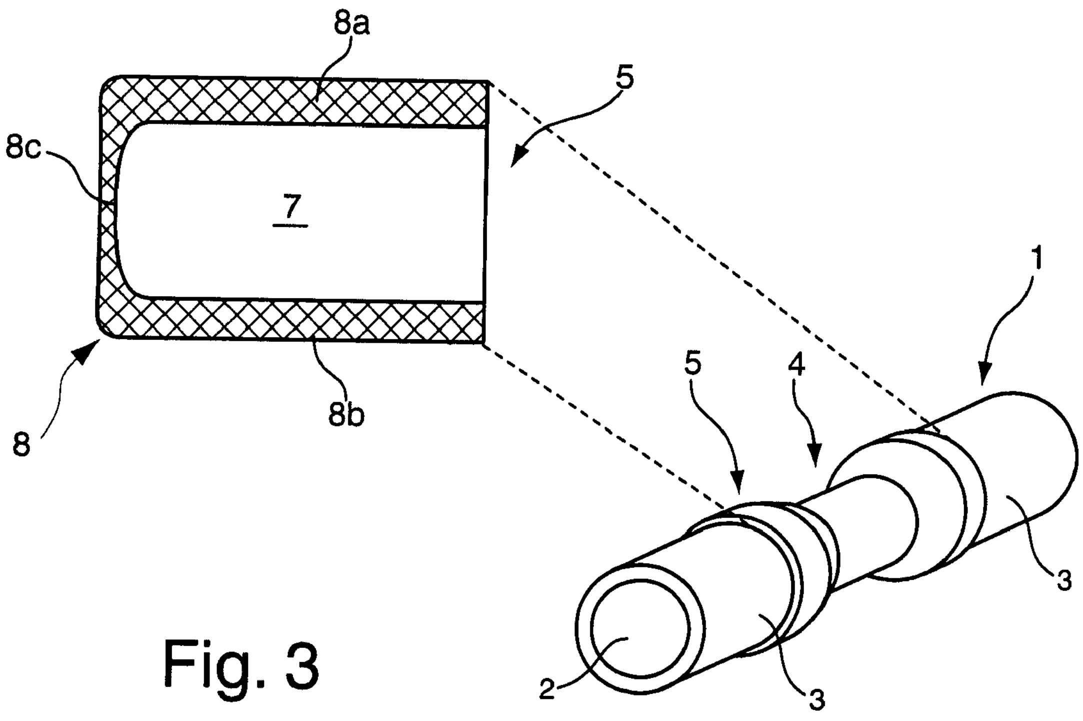
FIG. 3 is a schematic representation of the flexible element according to FIG. 2 used in connection with the electrical conductor of FIG. 1.

FIG. 3 shows a schematic representation of the flexible element according to FIG. 2 as used in connection with the electrical conductor of FIG. 1. According to the illustration of FIG. 3, flexible element 5 of FIG. 2 has been wrapped around the electrical conductor 1 of FIG. 1 so as to cover the bared conducting core 2 in said position 4 while extending over and covering the insulating material 3 in a vicinity to said position 4. In other words, flexible element 5 has been wrapped around electrical conductor 1 to cover the bared conducting core 2 in said position 4 while also covering the step-like shoulder of insulating material 3 adjacent to the bared conducting core 2. Owing to the configuration of said first and second portions 7, 8 in FIG. 2, flexible element 5 can be wrapped around electrical conductor 1 so that parallel legs 8*a*, 8*b* of said U-shaped second (adhesive) portion 8 are placed on and adhere to insulating material 3 in the vicinity of said position 4 for to prevent humidity, dust or the like from entering below flexible element 5. Owing to said U-shaped configuration of second portion 8, a third section 8*c* of said second portion 8 can be used to securely fix the free outer end of flexible element 5 when the latter has been completely wrapped around the electrical conductor 1 at least once in order to cover conducting core 2.

Owing to the flexible nature of flexible element 5, the latter can be arranged to effectively model, i.e., follow the outer contour of electrical conductor 1 the conducting core 2 of which is partly covered with and partly free from insulating material 3 so that electrical conductor 1 does not present a constant diameter. Furthermore, owing to its flexible nature, flexible element 5 can be used to provide thorough electrical contact even with a braided, woven or corrugated conducting layer of conducting core 2. Flexible element 5 adheres to the insulating material 3 of electrical conductor 1 with its adhesive/second portion 8 and contacts the conducting core 2 of electrical conductor 1 in electrically conducting fashion with its first portion 7.

Figure 4:
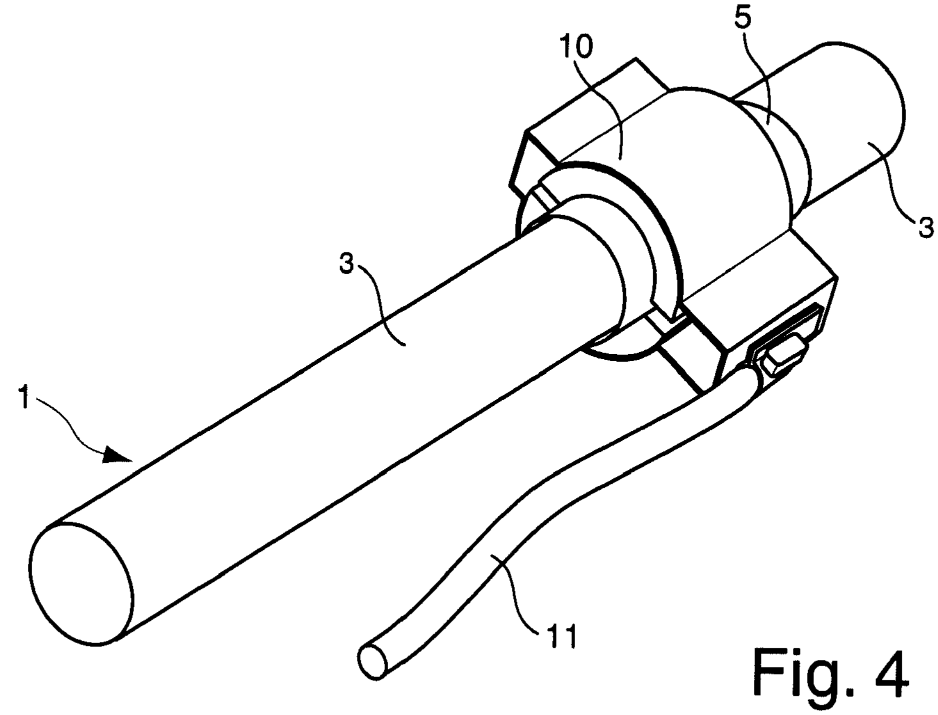
FIG. 4 is an electrical conductor as in FIG. 1 with at least one flexible element according to FIG. 2 and a contacting device installed on said flexible element.

FIG. 4 shows an electrical conductor 1 as in FIG. 1 with at least one flexible element 5 according to FIG. 2 and a contacting device 10 installed on said flexible element. As shown in FIG. 4, the contacting device may take on the form of a contacting clamp has been installed on flexible element 5, wherein the latter ensures thorough electrical contact between a contact element (not shown) of contacting device 10 and the conducting core of electrical conductor 1 (cf. FIGS. 1, 3). Contacting device 10 is connected with a further cable or wire 11 for lightening protection or potential equalization purposes.

As can be gathered from the above description of preferred embodiments, a decisive advantage of the present invention resides in the simplicity of construction. Said simplicity is due to the fact that a high degree of weather resistance can be achieved due to the adhesive nature of the contact between the insulating material and the flexible element (up to IP68 and above). In the prior art, a main body of the grounding clamp must comprise special sealing lips or the like, such as butyl rings, in order to achieve a comparable degree of weather resistance.

Especially in case the flexible element is made of a metal foil, tolerances of the insulating material can easily be covered up. Conventional grounding clamps with rigid housings may experience leakages in case of huge tolerances of the insulating material. In this way, in conventional constructions tolerances of the insulating material must be levelled by providing additional sealing material.

As already mentioned above, owing to the deformation of the flexible element conducting cores comprising an outer conductor of a braided, woven or corrugated material can also be contacted. The flexible element adapts to the structure of the outer conductor, thus providing an electrically conducting contact. According to the prior art, contacting devices comprising contact elements of massive material only achieve a partial electrical contact with the braided, woven or corrugated material, which leads to high contact resistances.

Although a metal foil has been mentioned in the context of a preferred embodiment of the present invention, the flexible element is by no means limited to such a configuration. In general, any known or future flexible material which is able to contact an electrically conducting core in an electrically conducting fashion can be used to form the flexible element in accordance with the present invention. Furthermore, the flexible element may comprise a composite material having different properties on its inner surface (facing the conducting core) and on its outer surface (facing the contacting device). Furthermore, different materials may be used for constituting said first and second portions of the flexible element.

The invention claimed is:

1. A method of contacting an electrical conductor having a conducting core covered partly by an insulating material, the method comprising:

installing a contacting device in electrical contact with the conducting core in a position where the conducting core is free from the insulating material, and providing a flexible element comprising an electrically conducting material over the conducting core in said position prior to installing the contacting device, the flexible element comprising at least one adhesive portion which adheres to the insulating material in a vicinity of said position and a non-adhesive portion which contacts the conducting core.

2. The method of claim 1, further comprising the step of removing part of the insulating material to free the conducting core from the insulating material in said position prior to providing the flexible element.

3. The method of claim 1, further comprising wrapping the flexible element completely around the electrical conductor at least once in said position.

4. A flexible element for providing an electrically conducting contact between a contacting device and an electrical conductor according to the method of claim 1, the electrical conductor including the conducting corea which is partly covered by the insulating material, wherein said contact is to be formed in said position where the conducting core is free from the insulating material, wherein the flexible element comprises said at least one adhesive portion which is devised to adhere to the insulating material and said non-adhesive portion which is devised to contact the conducting core.

5. The flexible element of claim 4, wherein said electrically conductive material comprises a metal foil, at least one portion of which is provided with an at least one adhesive to form said adhesive portion.

6. The flexible element of claim 4, wherein the adhesive portion extends in a border area of the flexible element.

7. The flexible element of claim 4, wherein the adhesive portion has an overall U-shaped configuration.

8. The flexible element of claim 4, wherein the adhesive portion comprises butyl structures.

9. The flexible element of claim 4, wherein it comprises, at least in the nonadhesive portion, a material having a same or similar electrochemical potential as the conducting core.

10. The flexible element of claim 4, wherein it comprises a composite material at least in the non-adhesive portion, a first side of said composite material having the same or similar electrochemical potential as the conducting core, and a second side of said composite material having the same or similar electrochemical potential as the contacting device.

* * * * *